United States Patent [19]

Eckstein et al.

[11] 4,287,750

[45] Sep. 8, 1981

[54] DEVICE FOR CHECKING THE FUNCTIONING OF GAS MEASURING APPARATUS

[75] Inventors: Wolfgang Eckstein, Sereetz; Horst Rabenecker, Klein Parin, both of Fed. Rep. of Germany

[73] Assignee: Drägerwerk AG, Lübeck, Fed. Rep. of Germany

[21] Appl. No.: 81,792

[22] Filed: Oct. 4, 1979

[30] Foreign Application Priority Data

Oct. 6, 1978 [DE] Fed. Rep. of Germany ....... 2843651

[51] Int. Cl.³ .................... G01N 1/22; G01N 31/00
[52] U.S. Cl. .................................... 73/1 G; 73/37; 116/270; 356/256; 422/88
[58] Field of Search .................. 73/1 G, 40, 46; 116/270; 422/88, 86; 356/256

[56] References Cited

U.S. PATENT DOCUMENTS

| | | | |
|---|---|---|---|
| 3,241,514 | 3/1966 | Grimland | 116/270 |
| 3,388,975 | 6/1968 | Wallace | 422/86 |
| 3,533,272 | 10/1970 | Dahms | 73/1 G |
| 3,618,363 | 11/1971 | Kraus | 73/1 G |
| 3,703,879 | 11/1972 | Huthsing, Jr. | 116/270 |
| 3,824,836 | 7/1974 | Lyshkow | 73/1 G |
| 4,031,847 | 6/1977 | Sullivan | 116/268 |
| 4,172,378 | 10/1979 | Limp | 73/1 G |
| 4,208,912 | 6/1980 | Baldeck | 422/88 |

FOREIGN PATENT DOCUMENTS 950693 10/1956 Fed. Rep. of Germany ...... 116/270
2021325 1/1971 Fed. Rep. of Germany ...... 116/270

*Primary Examiner*—Daniel M. Yasich
*Attorney, Agent, or Firm*—McGlew and Tuttle

[57] ABSTRACT

A device for checking the functioning of a gas measuring apparatus which includes a tubular connection for the passage of a gas so that it can be directed through a tube mounted in the connection which has means therein such as a chemical for measuring the gas which is passing therethrough. The device comprises a translucent diffusing screen mounted on the tubular connection so as to be able to view through the screen and into the gas passage and a spring diaphragm connected to the tube having a side disposed in space relationship to the screen and viewable through the screen and gas between the screen and the diaphragm when the diaphragm is flexed in one direction in respect to the screen so as to position it closer to the screen. The diaphragm is also flexed by a pressure variation within the tube and on the exterior of the diaphragm, for example when the pressure conditions within the tube are not as to be expected for normal functioning so as to move the diaphragm in an opposite direction away from the screen and to render the diaphragm invisible when viewed through the screen and the gas. The diaphragm is advantageously made of a distinct color so that its appearance or disappearance from view is readily apparent.

2 Claims, 2 Drawing Figures

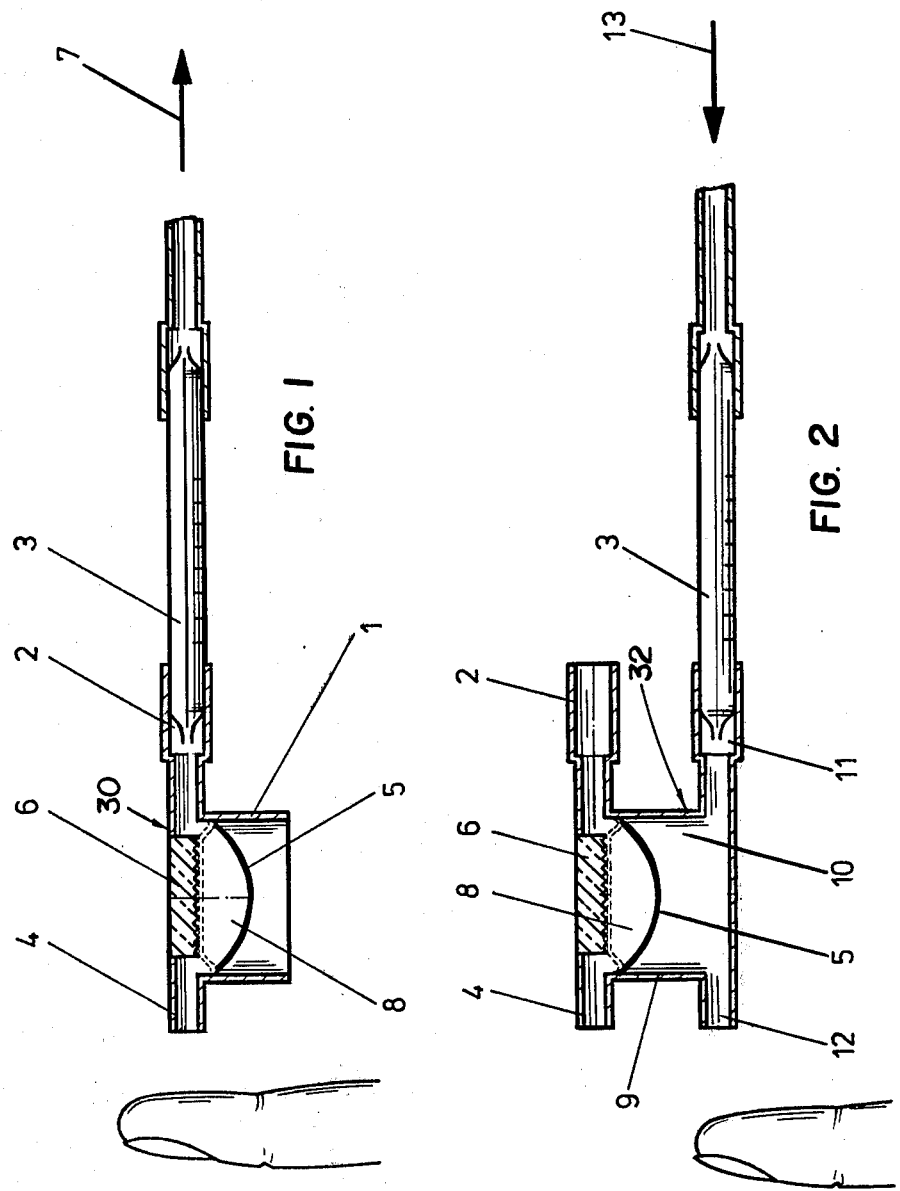

DEVICE FOR CHECKING THE FUNCTIONING OF GAS MEASURING APPARATUS

FIELD AND BACKGROUND OF THE INVENTION

This invention relates in general to gas measuring apparatus and in particular to a new and useful device for determining whether the apparatus is functioning properly.

In gas measuring devices, such as gas detectors equipped with conventional gas indicator tubes which are filled with reagents, the air to be tested is frequently directed through the tube for a long period of time either by pressure or by suction. The resulting low flow rates of tested air, which must be monitored in order to check operability of the detector cannot be determined with the use of the usual measuring and indicating devices. Operability however, may be checked by determining the pressure imminent in each flow motion.

A prior art indicator utilizing the presence of a pressure, such as a ± deviation from the gas pressure in breathing apparatus for high altitudes, comprises a cylindrical body which is connected to a diaphragm closing a pressure chamber. The device is provided with a preferably luminous mark and arranged in such a relationship to a conical mirror that in the rest position, the mark is masked by the mirror. At a predetermined pressure, the mark moves into the mirror and becomes visible. Aside from the motion of the diaphragm, the function of the device also requires movement of the cylindrical body. An indicator of such construction is necessarily complicated, particularly if positional independence is wanted (West German Pat. No. 950,693).

Another known pressure indicator, producing an optical signal, is responsive to compressed air and operates by displacing a piston within a compressed air system.

During its displacement, the piston penetrates a yielding, slotted diaphragm extending transversely to the displacement, and causes the areas bounded by the slots to bend. This bending indicates the pressure to be monitored within a system.

To operate, this pressure indicator again needs a movable part, namely the piston and has the same disadvantages of the device above West German Auslegeschrift 20 21 325.

SUMMARY OF THE INVENTION

In accordance with the invention there is provided a device for checking the operability of gas measuring apparatus which includes a housing with a tubular connection for the passage of a gas directed through a tube being of the type mounted in the connection, the tube having means for measuring the gas passing therethrough. The apparatus comprises a translucent diffusing sheet mounted in the housing in a manner such as to allow visual observation through the sheet into the gas passage. A spring diaphragm is connected to the housing and is disposed in space relationship to the sheet in a position such that it is viewable through the sheet and the passage when it is flexed in one direction that is in a direction toward the sheet. Pressure conditions in the gas passage will effect a flexing of the diaphragm in an opposite direction away from the sheet, for example, when the pressure conditions within the tube are not as expected for normal functioning. The position in which it is closest to the sheet, the diaphragm is visible by viewing through the sheet but when the diaphragm is flexed to an opposite position, it is no longer visible through the sheet.

The construction of the invention makes it possible to easily detect when the pressure conditions are not as expected and in addition it is a simple construction and operates reliably and is not susceptible to trouble in operation. No mechanical parts moving relative to each other are provided. The handling is reduced to shutting off a socket by means of the user's finger. In principle, the checking apparatus in use can remain attached to the gas measuring device. The tested air can flow therethrough without affecting the measuring operation and without being affected itself.

The device of the invention may advantageously comprise a housing which has an open end and an opposite end for receiving the testing tube. In addition, a chamber is defined on one side of the housing which has the diaphragm stretched across it in a position opposite the viewing sheet. Such a construction is desirable for testing when the flow of the test air is through the open socket and past the diaphragm and viewing sheet and then through the indicator tube. A modified construction may be used for the flow variation where the flow is in an opposite direction and in such case the chamber is connected on the side opposite to the diaphragm to another tube which has an open socket end and an indictor tube receiving end. Thus, the apparatus is capable of universal use without complication. When the device is to be used for a diaphragm which is loaded on the side of the passage of gas passing through the tubular connection the device may function similar to the embodiment in which the diaphragm is on the upstream side of the gas flow from the indicator tube without making the device more complicated. Both constructions are simple and reliable in operation.

Accordingly, it is an object of the invention to provide a device for checking the operability of gas measuring apparatus which includes a tubular connection for mounting an indicator tube through which the gas is passed from the connection through the tube and wherein a portion of the tube includes a viewing screen on one side and a flexible diaphragm on the other, the diaphragm being visable in one condition of pressure in which it is flexed toward the viewing sheet and being invisible in another condition of pressure in which it is flexed away from the viewing screen and all conditions of pressure being determined by the functioning of the device as a result of pressure conditions inside the passage of the tubular connection and outside of it.

Thus, in accordance with the invention, a device for optically checking the operability of a gas measuring apparatus of the type having a flow passage, such as an indicator tube with a tubular passage, for passing a gas to be tested therethrough at a low rate of flow is provided. The inventive device includes a housing defining a chamber having an inlet opening connection for receiving the gas in the chamber and an outlet opening connection for discharging the gas from the chamber. A spring diaphragm is flexibly mounted in the chamber to divide the chamber into a first chamber and a second chamber. The diaphragm is flexible responsive to the pressure in the first chamber. The inlet and outlet opening connections are in communication with the first chamber. The housing has a wall portion adjacent the first chamber which defines an aperture and a translucent diffusion screen is mounted in the aperture to permit observation of the first chamber of the outside of the housing. The housing includes a wall portion adjacent to the second chamber with a second chamber opening for establishing communication between the second chamber and atmosphere. Color indication means are provided on the side of the spring diaphragm adjacent the first chamber. In accordance with a preferred embodiment, the outlet opening connection is adopted to communicate with the tubular passage of the indicator tube. In accordance with an alternate embodiment of the invention, the wall portion of the housing adjacent the second chamber includes a second chamber inlet opening adopted to communicate with the tubular passage of the indicator tube for passing tested gas through the second chamber and said second chamber opening to atmosphere.

A further object of the invention is to provide a device for checking the operability of gas measuring apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is an axial sectional view of a device for checking the operability of a gas measuring apparatus constructed in accordance with the invention; and FIG. 2 is a view similar to FIG. 1 of another embodiment of the invention.

DESCRIPTION OF THE PREFERRED EMBODIMENTS

Referring to the drawings, in particular the invention embodied therein comprises in FIG. 1 a device for checking the operability of gas measuring apparatus which is operated by passing a gas to be measured through a tubular connection of the device, generally designated 30 in a system in which the gas to be tested moves in the direction of the arrow indicated 7 by suction. A very similar type of device for use in a construction in which the gas to be tested moves by pressure in the direction of the arrow 13 comprises a housing on tubular connection 32 as shown in FIG. 2. This device 32 may also be operated in the manner shown in FIG. 1 using the portions of the device which are common to each and which are similarly identified by numerals.

The operability checking apparatus according to FIG. 1 comprises a housing 1 with a outlet opening connection or receiving nipple 2 which is engaged over the suction end of a gas indicator tube 3. The air to be tested enters through an open socket 4.

One side of housing 1 through which the air to be tested passes is closed to the atmosphere by a colored spring diaphragm 5, the opposite side is closed by a translucent diffusing sheet 6 within an aperture extending through a wall portion of the housing. The diaphragm and the sheet enclose a first chamber 8. During normal testing operation, with the air to be tested flowing in the direction of arrow 7, through the operability checking apparatus and the gas indicator tube 3, spring diaphragm 5 and diffusing sheet 6 are spaced from each other by such a distance that due to the light diffusion by sheet 6, the colored spring diaphragm 5 is not optically distinguishable. The flow is controlled indirectly by fixing the pressure present therein. For this purpose, the inlet opening connection or open socket 4 is shut off, for example, by the operator's finger. The underpressure thereby produced in housing 1 relative to the atmosphere due to suction through tube 3 in direction 7, causes spring diaphragm 5 to move in the direction of diffusing sheet 6. As spring diaphragm 5 approaches diffusing sheet 6, the color of spring diaphragm 5 becomes optically distinguishable to the operator looking through sheet 6.

During a disturbance in operation, such as a leak or malfunction of the suction pump, resulting in a failure to draw sufficient air through gas indicator tube 3, a pressure which is too small or no under pressure is produced in first chamber 8, so that spring diaphragm 5 remains in its initial position and, therefore, is invisible to the operator.

In the embodiment of FIG. 2, housing 9 is substantially closed, in addition at its lower end toward the outer atmosphere to form a second chamber 10. Second chamber 10 is provided with an inlet opening or a tube-receiving nipple 11 a chamber opening of an open socket 12. Consequently, the function checking apparatus can be employed for checking both an operation under pressure and an operation under suction. With gas indicator tube 3 received in nipple 11 and the tested air flowing in the direction of arrow 13, the operator checks the operability of the indicator tube 3, i.e., the capability to pass gas, by checking for adequate pressure by shutting off socket 12, thereby causing the flexible diaphragm to flex towards the sheet 6 if sufficient pressure is present in chamber 10. While specific embodiments of the invention have been shown and described in detail to illustrate the application of the principles of the invention, it will be understood that the invention may be embodied otherwise without departing from such principles.

What is claimed is:

1. A device for optically checking the operability of a gas measuring apparatus, the gas measuring apparatus being of the type having a flow passage for passing a gas to be tested therethrough at a low rate of flow, comprising a housing defining a chamber having an inlet opening connection for receiving the gas in the chamber and an outlet opening connection for discharging the gas from said chamber, a spring diaphragm flexibly mounted in said chamber to divide said chamber into a first chamber and a second chamber, said diaphragm being flexible responsive to pressure variation between said first chamber and said second chamber, said inlet and outlet opening connections being in communication with said first chamber, said housing having a wall portion adjacent to said first chamber defining an aperture, and a translucent sheet mounted in said aperture to permit observation of said diaphragm through said sheet and first chamber from the outside of said housing, said housing having a wall portion adjacent to said second chamber with a second chamber opening for establishing communication between said second chamber and atmosphere, color indication means on the side of said spring diaphragm adjacent said first chamber, and said outlet opening connection including means for fluid communication with the flow passage.

2. A device for optically checking the operability of a gas measuring apparatus as set forth in claim 1, wherein said wall portion of said housing adjacent said second chamber includes a second chamber inlet opening including means for fluid communication with the flow passage for passing tested gas through said second chamber and said second chamber having an opening to atmosphere.

* * * * *